United States Patent [19]

Müller

[11] 4,456,233
[45] Jun. 26, 1984

[54] TENSIONING DEVICE FOR CHAINS

[75] Inventor: Anton Müller, Aalen-Unterkochen, Fed. Rep. of Germany

[73] Assignee: Eisen- und Drahtwerk Erlau Aktiengesellschaft, Aalen, Fed. Rep. of Germany

[21] Appl. No.: 331,683

[22] Filed: Dec. 17, 1981

Related U.S. Application Data

[63] Continuation-in-part of Ser. No. 106,829, Dec. 26, 1979, abandoned.

[30] Foreign Application Priority Data

Dec. 23, 1978 [DE] Fed. Rep. of Germany ....... 2855989

[51] Int. Cl.³ ............................ F16F 3/02; F16F 1/32
[52] U.S. Cl. .................................. 267/70; 24/68 CT; 24/68 TT; 267/162; 403/166
[58] Field of Search ...................... 267/69, 70, 71, 72, 267/73, 74, 161, 162; 152/217, 218, 219; 24/68 R, 68 CT, 68 TT; 254/201; 403/166

[56] References Cited

U.S. PATENT DOCUMENTS

| 703,713 | 7/1902 | Smith et al. | 267/70 |
|---|---|---|---|
| 716,633 | 12/1902 | Hains et al. | 267/70 |
| 720,199 | 2/1903 | Wahl | 267/71 X |
| 912,927 | 2/1909 | Winans | 267/71 |
| 2,273,753 | 2/1942 | Gelinas | 152/217 |
| 2,387,266 | 10/1945 | Holland | 267/162 X |
| 2,595,642 | 5/1952 | Daland | 267/70 X |
| 3,466,024 | 9/1969 | Spieth | 267/69 |
| 3,759,351 | 9/1973 | Purple | 267/162 X |
| 3,871,193 | 3/1975 | Young | 403/166 X |
| 4,183,510 | 1/1980 | Kontis | 267/70 |
| 4,215,733 | 8/1980 | Rieger et al. | 152/218 X |

FOREIGN PATENT DOCUMENTS

| 182538 | 4/1907 | Fed. Rep. of Germany | 262/69 |
|---|---|---|---|
| 2445240 | 4/1976 | Fed. Rep. of Germany | 267/162 |
| 466514 | 5/1914 | France | 267/71 |
| 16905 | of 1909 | United Kingdom | 267/162 |
| 141088 | 4/1920 | United Kingdom | 267/72 |

Primary Examiner—George E. A. Halvosa
Attorney, Agent, or Firm—Becker & Becker, Inc.

[57] ABSTRACT

A tensioning device for chains such as tensioning chains, sling chains, tire chains and the like with a tensioning unit having at least one tensioning spindle which is connected with a tensioning nut and having at least one damping spring. The damping spring is a cup spring package and the cup spring package is installed in the tensioning unit. A multiplicity of the cup springs of the spring package can have a single layer and the remaining cup springs can have multilayer arrangement. More than half of the spring path, preferably approximately 80% of the entire spring path of the spring package is preloaded with a half force which is at least smaller by approximately one half than the preloading force of the remaining spring path. A control device has an indicator connected with a tensioning spindle and this indicator such as a bolt is movable, preferably is journalled longitudinally shiftable in a housing opening. The bolt is located approximately radially with respect to the tensioning spindle and preferably is secured to an abutment or ring at one end side thereof such as a plate and the bolt projects with another end into the housing having an opening therein.

14 Claims, 10 Drawing Figures

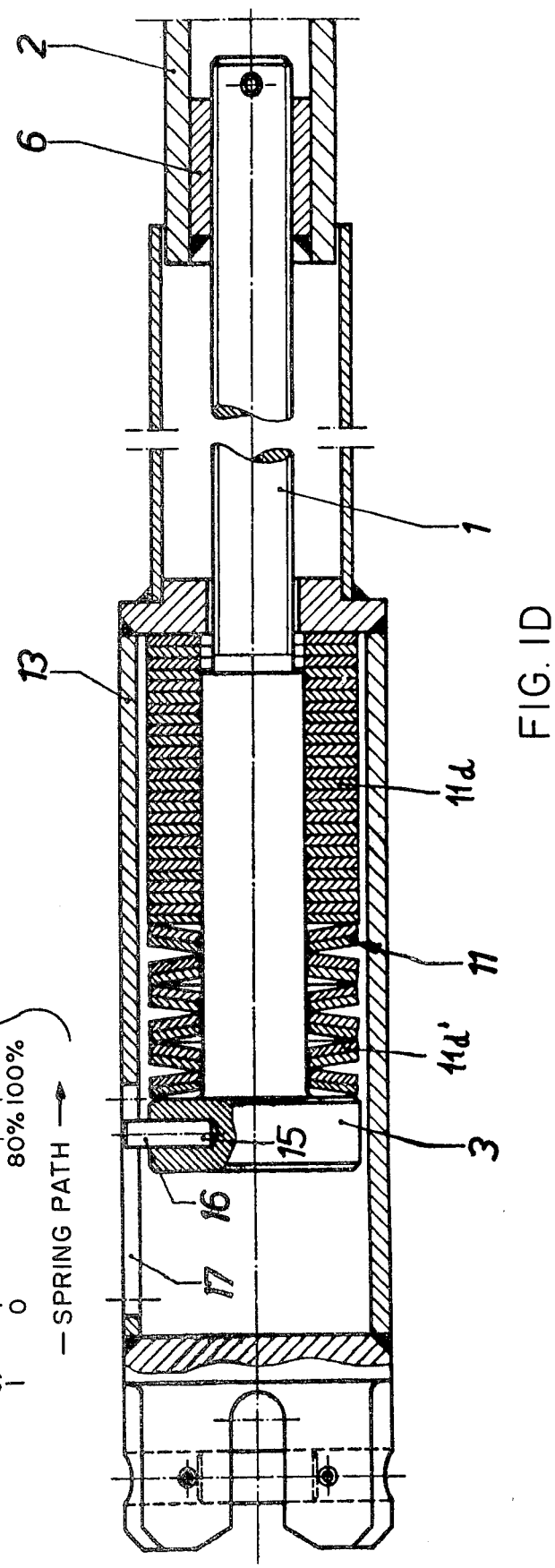

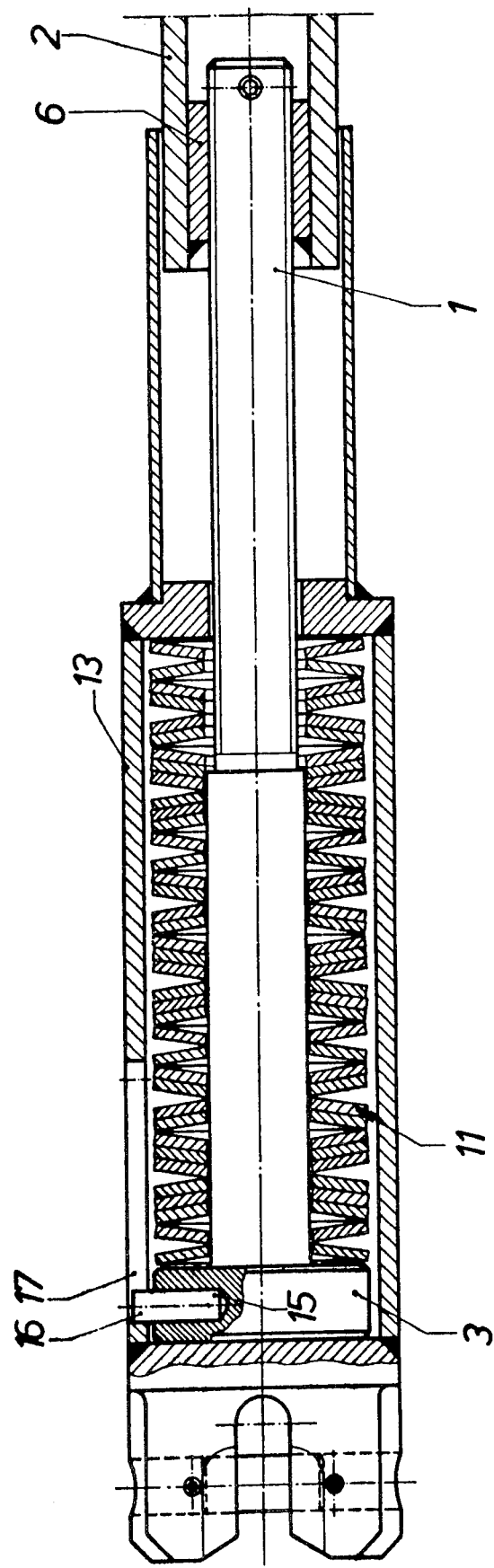
FIG. IE

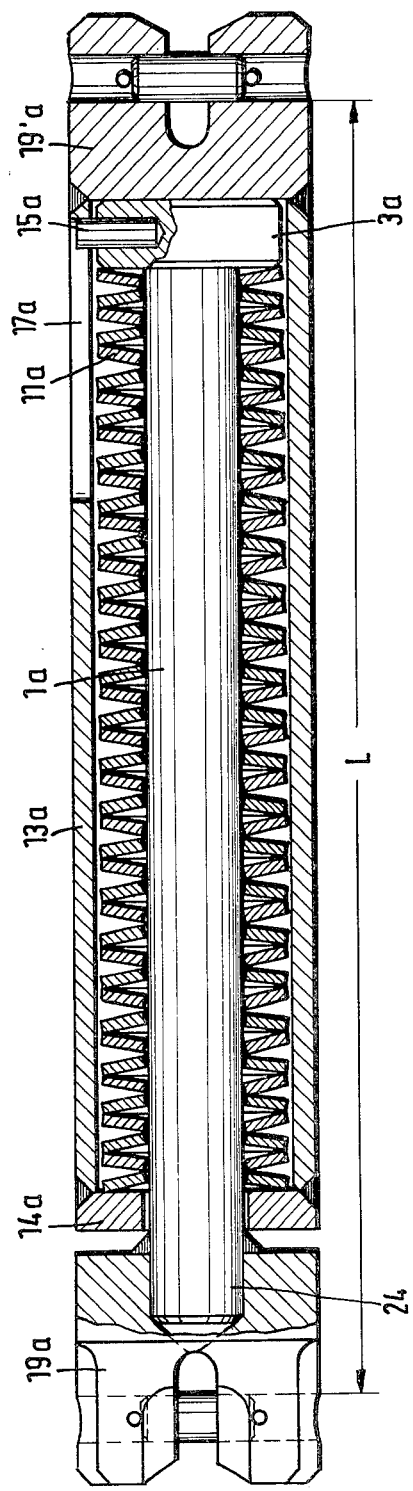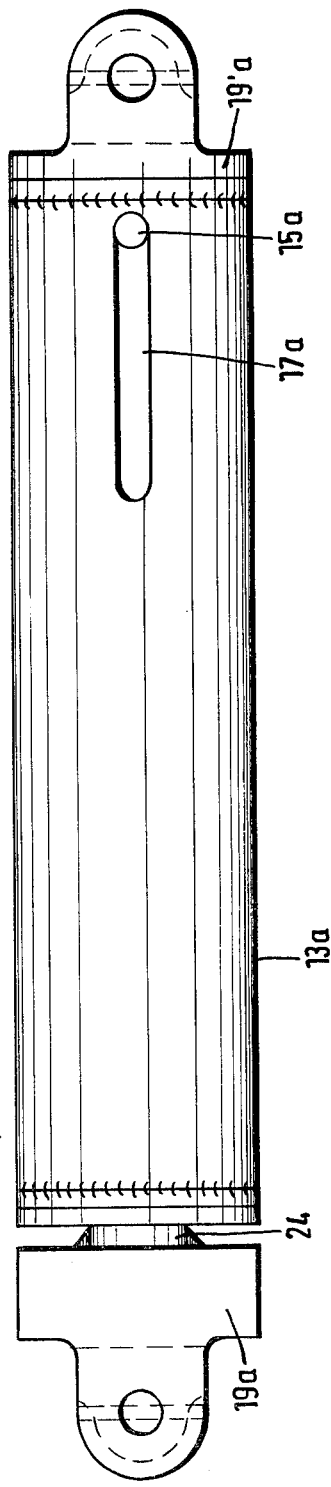

TENSIONING DEVICE FOR CHAINS

This is a continuation-in-part of co-pending parent application Ser. No. 106,829-Müller filed Dec. 26, 1979, now abandoned.

The present invention relates to a tensioning device for chains, such as tensioning chains, arresting chains, tire chains and the like with a tensioning unit that has at least one tensioning spindle connected by a thread with a tensioning nut and having at least one damping spring.

With a known tensioning device of this type, the damping spring is arranged in a region adjoining the tensioning unit of the chain and is formed by a spiral or helical spring. Consequently, the tensioning device cannot be used in short chains and no large forces can be taken up with short span paths.

The object which is the basis of the present invention is to embody a tensioning unit of this type so that it has only a nominal length on one hand and on the other hand however can still receive or take up high forces.

This object is inventively resolved thereby that the damping spring is a cup-spring package and that the cup-spring package is installed or accommodated in a tensioning unit.

As a consequence of the utilization of cup springs as damping springs, the present inventive tensioning device can be built very short capable of taking up very high forces according to the arrangement and embodiment of the individual cup springs of the package. Since the cup-spring package is arranged within the tensioning unit, the length of the tensioning device is determined only by the length of the tensioning unit. Since the cup-spring package has only very nominal length, the tensioning unit can be kept extremely short. Consequently the tensioning unit is especially suitable for utilization in short chains where short span paths are necessary with high effective forces.

This tensioning unit is even more suitable for such chains since the present inventive tensioning unit has only a very nominal width.

These and other objects and advantages of the present invention will appear more clearly from the following specification in connection with the accompanying drawings, in which:

FIG. 2 shows a longitudinal section of a second embodiment of a tensioning unit in accordance with the present invention;

FIG. 3 is a plan view of the tensioning unit of FIG. 2;

FIGS. 1A, 1B, 1C, 1D, 1E, 2A and 2a show various embodiments of single, double and triple plate spring arrangements according to the present invntion; FIG 1d is a graph showing spring force and spring path relationships involved with the present invention.

Figure 1:
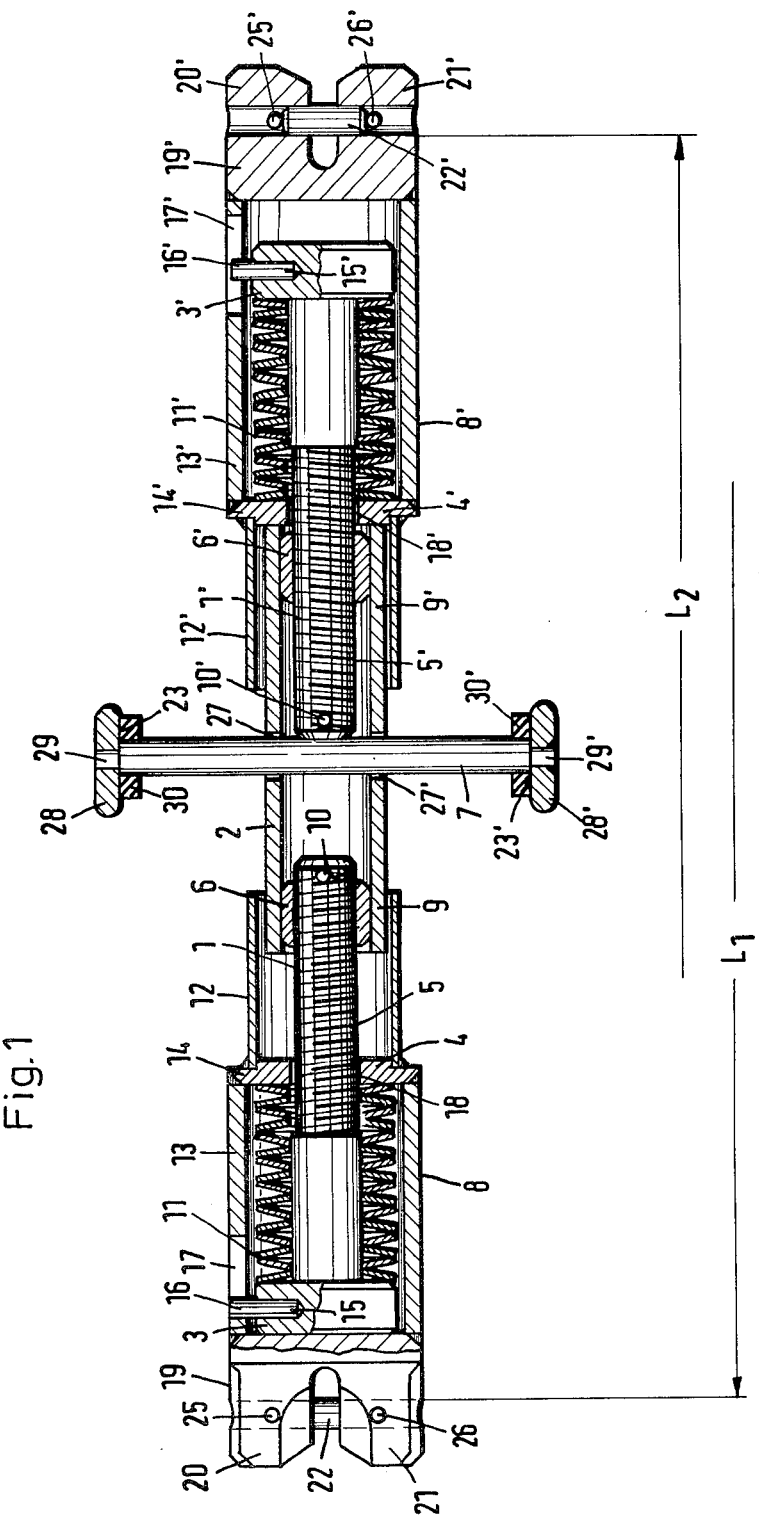
FIG. 1 shows a longitudinal section of a first embodiment of a tensioning unit in accordance with the present invention.

Referring now to the drawings in detail, the tensioning unit according to FIG. 1 has two tensioning spindles, 1, 1' which are connected with each other by a tensioning unit 2. The tensioning spindles 1, 1' are embodied having a bolt form or shape and carry a plate 3, 3' at one end thereof. The plates 3, 3' are rigidly connected with the tensioning spindle, preferably being welded thereto. Both tensioning spindles 1, 1' over more than half the length thereof have an outer thread 5, 50' which extends as far as to the end of the tensioning spindle away from the plate 3, 3'. A tensioning nut 2 embodied as a sleeve subject to intermediate positioning of a one-sided screw socket or threaded bushing 6, 6' is guided upon the part of the tensioning spindle having the outer thread 5, 5' thereon, the screw socket or threaded bushing being preferably soldered into the tensioning nut 2. Both tensioning spindles have a left and a right thread means which can be embodied as sharp angular or V-threads or acme screw or trapezoidal threads. By turning or rotation of the tensioning nut 2 with a lever 7, those tensioning spindles 1, 1' are oppositely shifted whereby the non-illustrated chain is shortened or lengthened.

Both screw sockets or threaded bushings 6, 6' of the tensioning nut 2 have such a length that the pulling or tensioning forces arising during application or use thereof can be taken up without damage to the interengaging threads. Since the tensioning nut has a greater inner diameter than the screw socket or threaded bushing 6 and 6', the part of the tensioning spindles 1, 1' located within the tensioning nut has spacing from the inner wall of the remaining portion of the tensioning nut so that a disturbance-free tensioning of the chain is assured.

Every tensioning spindle in a region of an end thereof away from the plate 3, 3' has a diametral extending pin 10, 10' projecting with both ends over the pertaining tensioning spindle and serving as an abutment for the screw socket or threaded bushings 6 and 7 so that the tensioning spindle cannot be completely screwed or turned and rotated therefrom.

Two damping springs 11, 11' are provided so that the tensioning unit, and not the chain or hooks or locks of the chain, can take up the jerk-like, jolt-like or tugging forces arising during installation and use of the chain for example during quick stopping or braking and/or during a quick acceleration, without encountering any damage.

The damping springs 11, 11' are formed by respective cup- or plate spring packages and form a part of the tensioning unit 12 consisting of the tensioning spindles and the tensioning nut. Consequently there is eliminated not only the necessary additional construction length encountered with previously known tensioning devices for the damping springs but rather still higher forces can be taken up also in comparison to spiral pressure springs or truncated cone springs with simultaneous reduction of the external diameter of the tensioning unit. The tensioning unit is accordingly made relatively short and narrow so that the tensioning unit is suitable for utilization with short chains. The spring packages 11, 11' are arranged around the tensioning spindles 1 and 1' for attaining a simple construction. The spring packages cannot be overloaded in operation. Moreover, the tensioning path of the tensioning device can be accurately predetermined in an advantageous manner with the spring packages. For the purpose of varying the magnitude of the force to be taken up corresponding to the intended installations or situations of use of the tensioning unit, the spring packages can be so embodied that the individual cup springs are layered singly or in multiple layers as well as in the same or alternate sense with respect to the package. However, alternately or oppositely arranged packages in rows against each other can be used as damping springs. In the FIGS. 1 and 2, spring packages are illustrated having a spring path of 19.5 mm by alternate or oppositely arranged rows of cup springs in rows against each other and moreover including twenty-six pieces or cup springs. For example, 50% of the springs can be arranged in a single layer, 25% of the springs can be arranged in a dual layer arrangement and the remaining 25% of the springs can be arranged in a triple layer arrangement. Consequently the pretensioning force rises with increasing tension path so that the tensioning device cannot be loaded for block formation. With a different more purposeful arrangement of the springs in the spring package 11, 11', for example 80% of the collective or entire spring path is preloaded with a force of 800 kp, while the remaining 20% of the spring path is preloaded with 1,600 kp, for which purpose the cup springs or cup spring packages have different carrying capacity attained thereby that either differently thick cup springs or different layering of cup spring packages including identical individual springs are arranged in rows relative to each other.

For protection against contamination and damaging thereof the spring packages 11, 11' are installed or accommodated purposefully in a pipe-type housing 13, 13'. Consequently, the tensioning device also can be used to encounter hard and difficult installation requirements and conditions without influencing the functional capability thereof. The housing 13 and 13' can surround in addition to the spring packages 11, 11' also the pertaining tensioning spindles 1, 1' and the housings extend with the shortest length of the tensioning unit (right side in FIG. 1) as far as to over approximately ¾ of the pertaining half of the tensioning nut 2, in other words with maximum tensioning of the chain. Consequently the tensioning spindles 1 and 1' are protected to the highest extent against damage and contamination and a very secure guidance is made possible during shifting of the tensioning spindles 1, 1' in the tensioning nut 2.

The housing structures 13, 13' serve furthermore for assuring positioning of the spring packages 11, 11' and preclude that the spring packages can bend through over the length thereof. Consequently the spring force is effective always exactly in the longitudinal direction of the tensioning device so that the spring packages can take up the complete predetermined force. The spring packages 11, 11' have a minimum play within the housing structure 13 and 13' and with a minimum play the spring packages 11, 11' lie upon the pertaining tensioning spindles 1 and 1' so that during tensioning the spring packages 11, 11' do not snag or hang up along the housing inner wall or along the tensioning spindle outer side or surface and accordingly the spring packages 11, 11' can expand or be relieved without hindrance. The spring packages are supported with one end thereof against the one end wall or face 14, 14' of the housing structure 13, 13' serving as a counterbearing and with the other end thereof the spring packages engage against the plates 3, 3' upon the tensioning spindle 1, 1' serving as counterbearings. As a consequence of this arrangement and position of the counterbearings 3, 3' and counterbearings 14, 14', the constructional length of the tensioning unit is further reduced without influencing the possible tension path. The embodiment of the counterbearings 3, 3' as a plate makes possible a large-surface engagement and supporting of the spring packages. Likewise, the spring packages can engage or be supported satisfactorily against the housing face or end walls 14, 14'.

To preclude a rotation or turning of the tensioning spindles 1, 1' within the housing structure 13, 13', the plate 3, 3' is fixed against rotation in the housing. The bolts 15, 15' secure the plate 3, 3' against rotation and the bolts 15, 15' are stationary and fixed in a face or end wall 3, 3' and the ends 16, 16' of the bolts 15, 15' project at right angles or vertically of the longitudinal axis of the tensioning device and extend over the walls 3, 3'. There is inventively essential that these ends 16 and 16' project at a time into the pertaining longitudinal slots 17 and 17' of the housing structure 3 and 3' because consequently the bolts 15 and 15' serve not only as a means for securing against turning or rotation for the tensioning spindles 1 and 1' but rather also the bolts 15 and 15' serve as a means for tightening or drawing-in load for the chain. This is especially advantageous with short chains where high forces easily can lead to excessive loading of the chain and components and parts thereof. Damage to the chain and the connection parts accordingly can be satisfactorily avoided.

The length of the longitudinal slots 17 and 17' is so selected that the length corresponds to the entire tensioning range. This is characterized by markings (not illustrated) at the slot ends. Additionally the free ends 16, 16' of the bolts 15, 15' are marked in color for quick recognition and reading of the particular force.

The tensioning spindles project through central openings 18 and 18' of the end wall 14 and 14'. The tensioning spindles 1 and 1' are guided shiftably by way of the screw sockets or threaded bushings 6 and 6' in the tensioning nut 2 between the openings 18 and 18'. The tensioning nut has opposite ends 9 and 9' which project into the housing structure 13 and 13' in the relaxed or relieved position of the tensioning device (left side in FIG. 1); the ends 9 and 9' project so far into the housing structure 13 and 13' that the screw sockets or threaded bushings 6 and 6' are arranged inside the housing. The screw sockets or threaded bushings 6 and 6' are located in a tapered housing segment 12, 12' which is secured on the corresponding end walls 14, 14' respectively, for example being welded thereto. Preferably the end surfaces or walls 14 and 14' have an axially extending shoulder or flange 4, 4' which projects in a positive manner into the housing segments 12 and 12' in a structurally complementary relationship thereto. The end walls 14 and 14' in the embodiment of FIG. 1 are respectively separate parts which are also welded to the outer widened or expanded housing segments 8 and 8'.

As a consequence of the arrangement of the housing structure 13, 13' and the embodiment of the tensioning nut 2 as a sleeve, the segment of the tensioning spindles 1 and 1' carrying the outer threads 5, 5' can be protected in the housing over the entire length thereof and is arranged in the tensioning nut 2 so that the threads or pitch of the screw thread of the tensioning spindle cannot be contaminated or subjected to dirt. Consequently, the tensioning device also even after long period of use assures a disturbance-free tensioning. The length of the housing structure 13 and 13' measured in the axial direction of the tensioning spindle is naturally so large that the maximum tensioning length determined by the length of the tensioning spindle segment carrying the outer threads 5, 5' can be utilized. When the tensioning nut 2 with its ends 9 and 9' projects into the housing structure 13 and 13' eventually arising forces effective at right angles to the axis of the tensioning nut 2 are also taken up by the housing so that the tensioning spindles 1 and 1' are only nominally loaded by deflection or bending.

A fork-formed connection piece 19, 19' is fastened at a time at the axially outer end surfaces of the housing structure 13 and 13'; the connection pieces 19, 19' have openings for journalling or bearing bolts 22 and 22' in alignment with each other in both legs 20, 21 or 20', 21' of the connection pieces 19, 19'. End members of a pertaining chain strand (not illustrated) are hung or suspended in the bearing bolts 22 and 22'. Each of the legs or shanks at a time has an opening extending at right angles to the longitudinal axis of the bearing bolt for receiving a safety pin 25, 26 or 25', 26' to secure the position of the bearing bolts 22 and 22'; the pertaining bearing bolt is axially secured between the safety pins.

The connection pieces 19 and 19' with the bearing bolts 22 and 22' are preferably so embodied that only a chain can be suspended or hung therein which is matched or adapted to the particular tensioning device in relation to the carrying capacity or capability thereof. The bearing bolts 22 and 22' can be released from the connection pieces 19 and 19' for exchanging of the chain or tensioning device.

A tensioning lever 7 is journalled at the half length of the tensioning nut 2 and this tensioning lever projects through two diametral oppositely located openings 27 and 27' in the tensioning nut 2. The tensioning lever 7 is linearly embodied or straight and shiftably journalled in the tensioning nut 2. To proclude that the tensioning lever 7 slips or slides through the tensioning nut, the tensioning lever 7 at both ends has an abutment 28, 28' respectively which consists of an annular shoulder or ring surrounding each of the tension lever ends 29, 29' reduced in diameter and the outer diameter of the ring is greater than the diameter of the openings 27, 27'. To proclude during the lashing or tightening that the material or goods being lashed or tightened especially plate or tin containers would be damaged by the rings 28 and 28' (abutments) further elastic rings 30 and 30' wider in diameter and preferably consisting of rubber can be provided at the inner surfaces 23 and 23' toward each other.

The tensioning lever 7 is so journalled on the tensioning nut 2 that the tensioning spindles 1 and 1' are still spaced from the lever segment located within the tensioning nut 2 or at most engage the lever segment located within the tensioning nut 2 when the tensioning spindles 1 and 1' are in a position of travel located completely in the housing structure 13 and 13'. The tensioning nut 2 with the lever 7 thereof is so rotated about its axis for tensioning the chain that both tensioning spindles 1 and 1' are shifted in a direction toward each other. As a consequence of the securing of the position of the bolts 15 and 15' engaging into the plates 3 and 3' there is precluded that the tensioning spindles 1 and 1' and the housing structure 13 and 13' rotate so that the chain links or strand hung or suspended into the connection pieces 19 and 19' are not rotated or turned. The plates 3 and 3' engage against the connection pieces 19 and 19' under the force of the spring packages 11, 11'. The force of the spring packages is so high that the tension or pulling exerted during tensioning by both chain strands upon the housing structure 13 and 13' is smaller than the force necessary for pressing together or compacting the spring packages. Consequently the housing structure 13 and 13' engages against the plates 3 and 3' in a direction toward each other during shifting of both tensioning spindles 1 and 1'. The spring force is so selected that the chain strand is sufficiently strong to be tensioned with the tensioning device. For relaxing or relieving purposes, the tensioning lever 7 only needs to be rotated in opposite direction, whereby both tensioning spindles 1 and 1' are shifted in a direction against each other as a consequence of the interengaging or meshing threads of the threaded bolts 6 and 6' and tensioning spindles 1 and 1'. The end position is reached during relaxing or relieving when the pins 10 and 10' engage against the threaded bolts 6 and 6' in the region of the tensioning spindle ends. The maximum tensioning is attained when the tensioning spindles engage against the tensioning lever 7 (FIG. 1, right half). If high forces now arise in a jolting or jerky manner during installation, as for example during quick braking-off, then the housings or housing structure 13 and 13' with respect to the tensioning spindles 1 and 1' are shifted against the force of the spring packages 11, 11', whereby the bolts 15 and 15' slide in the longitudinal slots 17 and 17' of the housing structure 13 and 13'. The spring packages take up these higher forces and consequently protect the entire tensioning device against damage or breakage. Immediately after the force decreases, the spring packages press the plates 3 and 3' again against the end walls 16 and 16' of the housing structure. In the sample embodiment, the greatest length $L_1$ of the tensioning device amounts to 492 mm additionally with a spring path of twice 19.5 mm and the smallest length $L_2$ amounts to 396 mm with a spring path of twice 8 mm.

With the embodiment according to FIGS. 2 and 3, only one spring package 11a is used having oppositely arranged or serially stacked cup springs with partially differing thickness. The spring package 11a which is seated upon a rod corresponding to a spindle is installed and accommodated in a housing 13a. This structure at one end carries a connection piece 19'a that preferably is welded to the pertaining end surfaces. The other connection piece 19a is welded to the other free end 24 of the rod 1a away from the plate 3a. For this purpose, the end 24 projects into a corresponding opening of the connection piece 19a. Otherwise, the connection pieces are embodied to correspond with the embodiment of FIG. 1.

The load indication and securing against rotation on the other hand is formed by a bolt 15a which projects over the plate 3a and which is shiftably guided in a longitudinal slot 17a of the housing 13a. In contrast to the previously described housings, the housing 13a has the same outer and inner diameter over its entire length so that the end wall 14a away from the plate 3a in the relaxed or relieved position of the tensioning device forms an abutment for the connection piece 19a (FIG. 2). In a manner corresponding to the tensioning device according to FIG. 1, the longitudinal slot 17a is located approximately in the axial outer third of the housing 13a and terminates with only a nominal spacing from the connection piece 19a.

Since only one rod 1a is provided in place of both tensioning spindles according to FIG. 1, also no tensioning nut is provided for connection of the tensioning spindles. The tensioning device according to FIGS. 2 and 3 is self-tensioning or automatically tensioned since the rod 1a is shifted into the housing 13a under the force of the spring package 11a as soon as the chain or chains are loosened or when forces arise in a jolt or jerky manner. These forces can be taken up satisfactorily by the single spring package 11a in that the relative shifting between the housing 13a and the rod 1a journalled in the housing to occur in a manner whereby the spring package 11a tensions itself. With this embodiment, also several spring packages can be arranged so that the tensioning device can take up high tensioning force and accordingly high forces can be taken up without danger of any damage or destruction of the tensioning device.

This device has a length L of preferably 208.5 mm in the telescope position of the rod 1a. The maximum damping force amounts to 8.21 kp with a maximum spring path of 40.5 mm.

The tensioning devices of the present invention are suitable for tensioning chains, sling chains, towing chains, tire protective chains and tire skid protection chains and most of all for lashing chains.

FIGS. 1A, 1B, 1C, 1D, 1d, 1E and 2A illustrate additional features in accordance with the present invention.

Figure 1A:
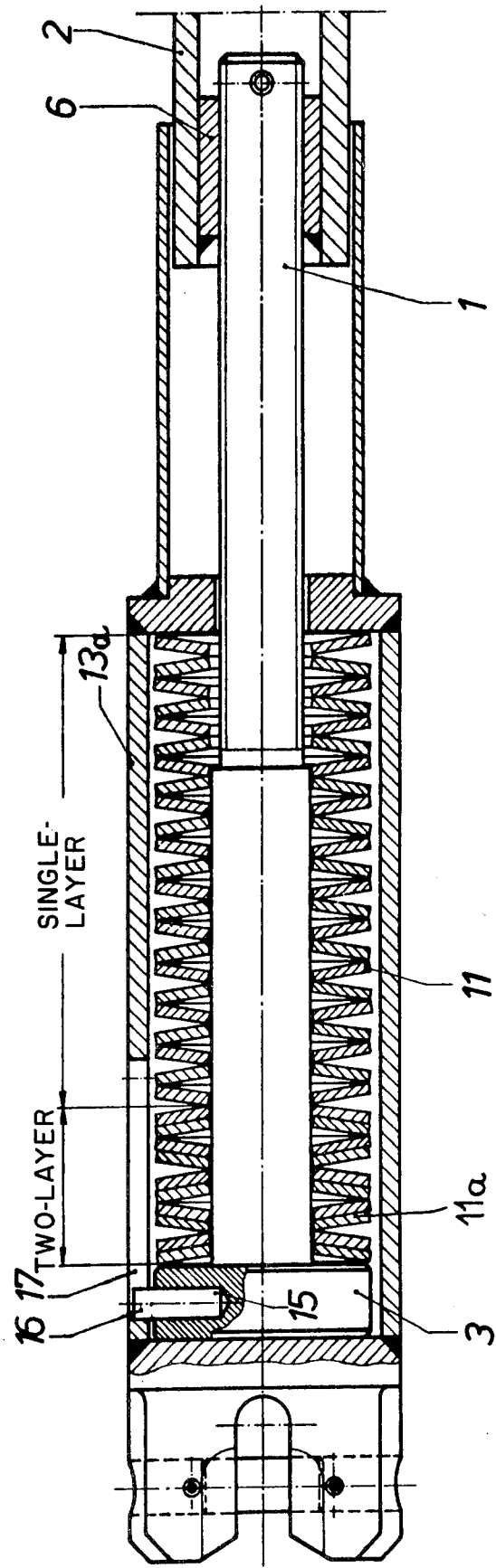
Figure 1B:
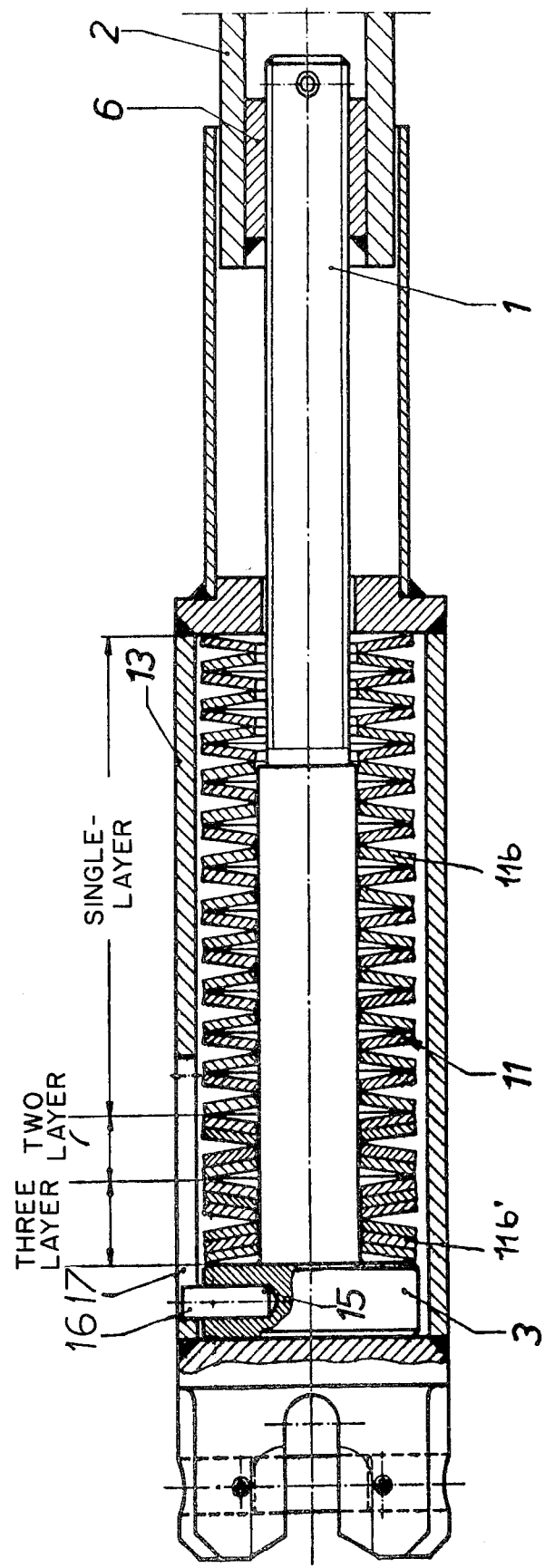

FIG. 1A shows a tensioning device with which the plurality of plate springs of the spring package means 11 are arranged in a single layer formation. Also arranged in the housing 13a aside from the single-layer arrangement of plate springs there are also installed or accommodated plate springs 11a arranged in a dual or two-layer arrangement. The dual or two-layer plate springs 11a are formed by having two plate springs under consideration lying in engagement against each other. Adjoining plate springs are arranged in rows in alternate or changing directions. Because of this embodiment or arrangement of the plate springs there is made possible that the tensioning device can be adapted or matched to the particular application in a simple and straight forward manner.

Figure 2A:
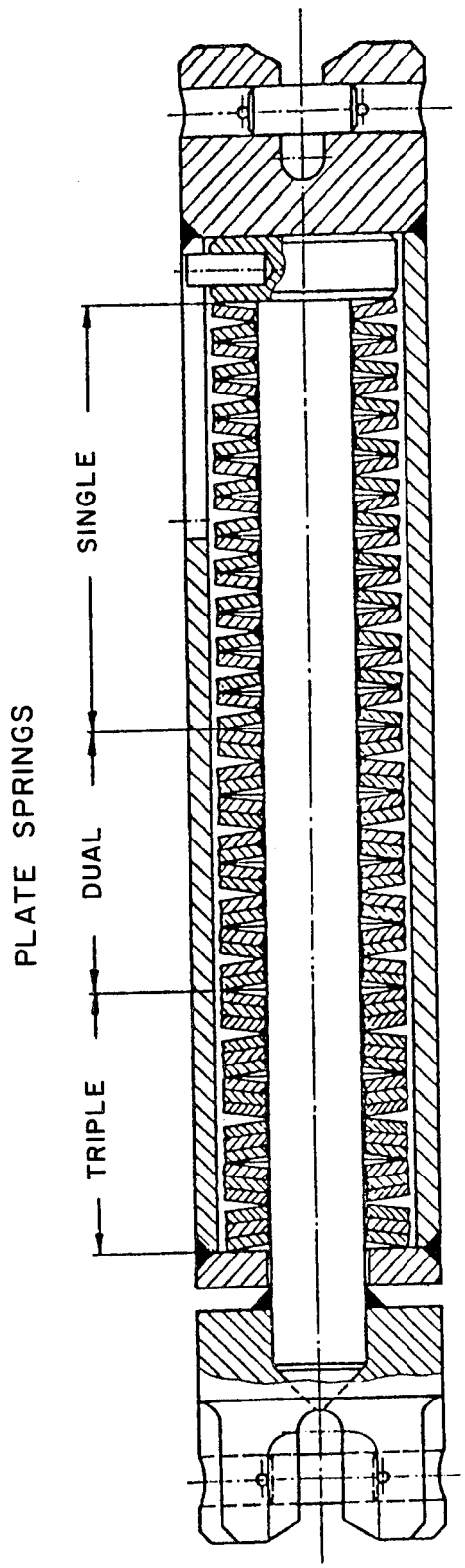

The plurality of plate springs of the spring package means 11 with the embodiment according to FIG. 2a likewise can be seen arranged in a single-layer configuration and the remaining plate springs are arranged having a multi-layer configuration. The single-layer arranged plate springs 11b extend over more than half the length of the spring package means 11 and are arranged having a positioning alternately or changing in direction with respect to each other. Of the remaining plate springs 11b' there can be seen that one-half thereof are arranged having a dual or two-layer arrangement and the other half has a triple or three-layer arrangement.

Two spring plates lie directly against each other with the dual or two-layer spring plate means under consideration and three spring plates lie directly against each other with the three-layer spring plate means under consideration. These spring plates arranged in multiple layers are arranged alternating or changing in direction against each other like the single-layer arrangement of plate springs. The dual or two-layer and triple or three-layer arranged plate spring means 11b' thus form layers of different spring numbers. Depending upon the application or utilization it is also possible as illustrated in FIG. 1C to arrange approximately one-half of the plate springs of the spring package means 11 having a single-layer arrangement (plate springs 11c) and approximately the remaining or other half can be arranged differently in multi-layers (plate springs 11c').

Figure 1C:
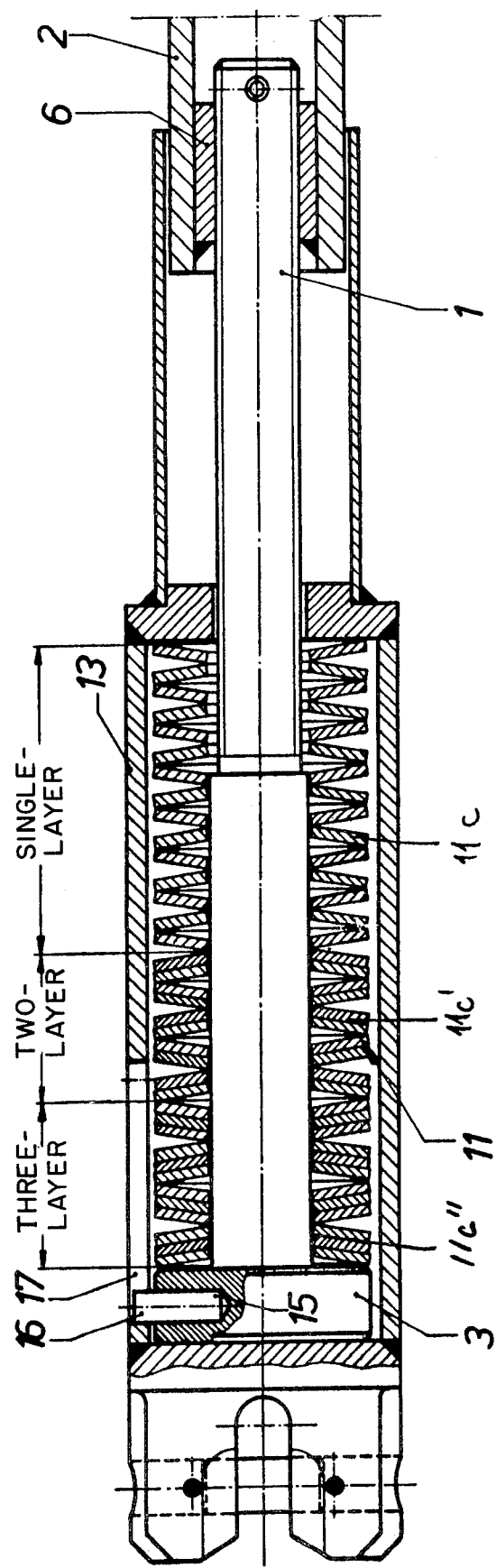

With a preferred embodiment, approximately 25% of these multilayer arranged plate springs are formed by dual or two-layer arranged plate springs 11c and approximately the other half being formed by three-layer arranged spring plates 11c" according to FIG. 1C. Each and every of the plate springs 11c through 11c" are arranged alternately or changing in direction against each other in a row.

With the embodiment according to FIG. 1D, more than one-half of the spring path of the spring package means 11 are stressed or tensioned with half the force $P_1$ which is at least approximately one-half smaller than the stressing or tensioning force of the remaining spring path. A graph or illustrated diagram of FIG. 1d shows the spring force P with respect to the spring path. There is apparent from FIG. 1d that after approximately 80% of the spring path, half of the stressing or tensioning force $P_1$ is provided or exists therewith. The single-layer arranged spring plates 11d are so strongly deformed with this spring path or with this initial stressing force $P_1$ so that the spring plates 11d engage completely against each other. The two-layer arranged spring plates 11d' in contrast still occupy the undeformed position thereof. The remainder of the spring path of 20% must still be covered or traversed for the purpose of also deforming these two-layer arranged plate springs 11d' so far that these plate springs 11d' engage completely against each other, whereby the initial stressing force is considerably stronger as a consequence of the two-layer arrangement than with the deformation of the single-layer arranged plate springs 11d. When the two-layer arranged plate springs 11d' are arranged in rows completely against each other, the initial stressing force $P_2$ is attained which is twice as large as the initial stressing force $P_1$.

FIG. 1E finally shows a tensioning device with which different layers of spring package means 11 under consideration are installed or accommodated in a housing 13.

The tensioning device moreover with the collective embodiments according to FIGS. 1A through 1E is moreover constructed identically like the tensioning device according to FIG. 1.

The present invention provides a tensioning device for chains, such as tensioning chains, sling chains, tire chains and the like comprising a tensioning unit which provides a tensioning nut 2 that at both ends provides opposite inner thread segments each for a thread spindle 1, 1' that projects into a corresponding housing part 13, 13' that is provided with a connection piece 19, 19' for suspending chain members and in which a plate spring package means 11, 11' is housed or accommodated that surrounds the threaded spindle 1, 1' and which is supported on an abutment 3, 3' of the threaded spindle 1, 1' and supported on an abutment 14, 14' of the housing structure 13, 13' whereby each threaded spindle 1, 1' is axially shiftable relative to the housing structure 13, 13' belonging therewith against the force of the plate spring package means 11, 11' and additionally being journalled secure against rotation and whereby the tensioning nut 2 in the region between both housing structures 13, 13' and the tread spindles 1, 1' has a handle 7 passing therethrough for rotation of the tensioning nut 2. The tensioning device includes means fixing against rotation identified by 15, 15', 17, 17' to provide a pin or bolt 15, 15' which engages into an axially extending slot 17, 17' in the housing structure 13, 13'. The pin or bolt 15, 15' is provided on an abutment or wall 3, 3' of the threaded spindle or tensioning spindle 1, 1'.

The pin or bolt 15, 15' is located radially of the threaded spindle of tensioning spindles 1, 1'.

U.S. Pat. No. 4,215,733-Reiger et al issued in August 1980 shows a tensioning device in the housing part of which (FIG. 6) two rods or bars are axially shiftable against the force of plate springs 29. Both rods or bars project outwardly through openings on both ends or face sides of the housing. The spacing between both rods or bars however, cannot be adjusted with this tensioning device. By means of an accentric 31 it is possible with the embodiment of FIGS. 8 and 9 only to shift both rods or bars outwardly against the force of the plate springs 29 so that the chain members belonging therewith can be easily hung or suspended in the link or connection members 21. Subsequently, the tensioning eccentric 31 is rotated so that both rods or bars under the force of the plate springs 29 belonging therewith are again pushed into the housing interior and consequently a tire chain is tensioned thereby.

With the inventive tensioning device in contrast both threaded spindles 1, 1' can be shifted in a stepless manner into the desired opposite position by rotation of the tensioning nut 2 by means of the handle 7. The threaded spindles 1, 1' are axially shifted in relation to the housing part or structure 13, 13' belonging therewith. By means of the bolts that secure of fix against rotation there is precluded that the housing structure 13, 13' and accordingly the link members 19, 19' are rotated during tensioning whereby the hung or suspended chains could be rotated. The plate spring packages 11, 11' protect the entire tensioning device against damage or breakage when in use jerky high forces arise. The housing parts or structures 13, 13' can then be shifted relative to the threaded spindles 1, 1' against the force of the plate springs. The plate springs under these circumstances receive or take up the high forces arising under these circumstances. As soon as the force decreases or diminishes, the plate springs 11, 11' press back the threaded spindles 1, 1' by way of the abutments or walls 3, 3' thereof into the housing structure 13, 13' into the adjusted position.

With the tensioning device according to the French reference No. 466,514—Angely issued in May 1914 there is provided only a single tensioning spindle 4 which however cannot be adjusted relative to the housing 1. The rod or bar 4 can be shifted only against the force of the pressure spring 13 in the housing 1 corresponding to the tension prevailing in the cable 7.

The tensioning device according to U.S. Pat. No. 703,713—Smith et al issued in July 1902 over seventy-eight years old likewise has only a single threaded rod or bar 5 which can be shifted relative to the housing 1 against the force of two pressure springs 9, 10. Also, with the reference E there is not provided any adjustment possibility for the rod 5 relative to the housing 1. The position of the rod or bar 5 relative to the housing 1 is determined by the tensioning force exerted by the chain hung or suspended in the hook 13. This tensioning device has no adjustment device comparable with the teaching of the present invention with which two threaded spindles can be adjusted relative to the housing parts or structure belonging therewith.

U.S. Pat. No. 2,273,753—Gelinas issued in February 1942 shows only a tensioning nut 19 with which two threaded spindles 20 can be adjusted simultaneously. This tensioning device however, has no means for securing against rotation so that there can not be precluded that both threaded spindles rotate against each other and consequently can be twisted or transposed in the members hung or suspended in the link members 21.

However, there is also believed to be no basis to provide this tensioning device with a tensioning device of U.S. Pat. No. 4,215,733—Rieger et al issued in August 1980 and No. 703,713—Smith et al issued in July 1902 or the foreign French reference No. 466 514—Angely issued in May 1914. The tensioning device according to the foreign French reference and according to U.S. Pat. Ser. No. 703,713—Smith actually have only a single rod or bar 4, 5 comparable with a threaded spindle so that with these tensioning devices the problem does not occur to embody the same in such a manner that simultaneously two such rods or bars can be adjusted in relation to two housing parts or structure. With these tensioning devices there is always proceeded on the basis that the rods or bars can be adjusted against spring force and however, that an adjustment which means an accurately prescribed position between the rod and the housing is not necessary. Also with the tensioning device according to U.S. Pat. No. 4,215,733—Rieger et al both rods or bars are to be shiftably journalled in the housing only against the spring force though not however adjustable relative to the housing. The average man skilled of the art would not have any basis to use the tensioning device of U.S. Pat. No. 2,273,753—Gelinas issued in February 1942 with such tensioning devices.

However, also the utilization of the arrangement of rods or bars known from U.S. Pat. No. 4,215,733—Rieger et al with the plate spring package 29 with the tensioning device according to U.S. Pat. No. 2,273,753—Gelinas does not lead to the teaching of the present invention. The U.S. Pat. No. 4,215,733—Rieger et al at most could provide showing or suggestion to arrange in a single housing the tensioning device according to U.S. Pat. No. 2,273,753—Gelinas; such a transfer however does not lead to the present inventive solution provided with two housing parts or structures 13, 13' which are connected with each other by way of both threaded spindles 1, 1' and the tensioning nut 2.

The U.S. Pat. Nos. 2,387,266—Holland issued in October 1945, 2,595,642—Daland issued in May 1952 and 3,466,024—Speith issued in September, 1969 show only tensioning devices with plate spring packages with which at a time one part under loading or tension against the force of the plate springs can be shifted relative to another part. An accurate adjustment of both parts relative to each other is not provided for with these tensioning devices. These tensioning devices are made similar to the tensionsing device according to U.S. Pat. No. 4,215,733—Rieger et al issued in August 1980.

The tensioning device according to U.S. Pat. No. 716,633—Hains et al issued in December 1902 over seventy-eight years ago also provides tensioning parts movable relative to each other against the force of plates springs C and these tensioning parts are formed by rods or bars that are connected with each other respectively by way of plates. This tensioning device differs completely from the teachings of the present invention since this tensioning device has no housing parts, no threaded spindles and also no tensioning nut.

The tensioning device according to U.S. Pat. No. 4,142,808 likewise has only one rod or bar 11 which is shiftable in a housing 10 against spring force and which however cannot be adjusted relative to the housing. Also a tensioning nut, threaded spindle means and plate spring packages are missing.

This is true also for the state of the art according to U.S. Pat. No. 4,183,510—Kontis issued in January 1980 which likewise provides only one tensioning device with parts shiftable relative to each other though not however, adjustable in relation to each other. Also here no tensioning nut, no tensioning spindle means and no plate spring packages are provided.

The tensioning device of U.S. Pat. No. 912,927—Winans issued in February 1909 which is over seventy-two years old has two U-shaped parts 20, 21 shiftable relative to each other which are shiftable against the force of a pressure spring 26. The connection or link parts 22 are each provided with threaded segments which are screwed into nuts 29, 30. With this embodiment the connection or link members 22 can be adjusted relative to the U-shaped parts belonging therewith by way of corresponding rotation in the nut 29, 30 belonging therewith. However, under these circumstances the connection or link members must be rotated about the longitudinal axes thereof so that the parts hung or suspended therein are rotated during the tensioning procedure. Such a tensioning device accordingly is not suitable for tensioning or chains. This state of the art differs from the teaching of the present invention thereby that for each connection or link member 22 a separate nut is provided so that both connection or link members cannot be simultaneously adjusted relative to each other. Also for the connection or link members there is not provided any means for securing against rotation. There is furthermore lacking a tensioning nut as well as a handle with which such a tensioning nut could be rotated.

Finally, the U.S. Pat. No. 3,759,351—Purple issued in September 1973 shows a damping device with which a rod or bar 22 can be shifted relative to a housing against the force of plate springs 38 through 41 inclusive. The rod or bar 22 however, cannot be adjusted in relation to the housing. There is lacking a tensioning nut and there are not provided any threaded spindles adjustable in relation to each other. This state of the art is completely different from the teaching of the present invention.

Plate springs are illustrated in a single, double and triple position to show how the plate springs are arranged with double or triple arrangement.

Only U.S. Pat. No. 2,273,753—Gelinas issued in February 1942 shows a stretching or tensioning device, while other references under consideration only describe the damping apparatus. This difference is of basic meaning since with damping apparatus or devices it is not possible to tension, stretch or tighten chains. The link members with tensioning devices as described in detail in the present case should be brought to the greatest possible spacing from each other for joining of the corresponding chain members. This is attained with the teaching of the present invention by turning or rotating of the tensioning nut 2 by means of the lever 7 whereby the threaded spindles 1, 1' are shifted outwardly opposite to each other. Then the chain members can be easily joined in the link members 19, 19'. Subsequently the tensioning nut 2 is turned or rotated in the opposite direction and both threaded spindles 1, 1' are moved in a direction toward each other whereby the chain strands joined in the link members are tensioned or tightened.

With the damping devices or apparatus according to the Winans Pat. No. 912,927 issued in February 1909 and the Purple Pat. No. 3,759,351 issued in September 1973 there is noted and stressed that only impacts or shocks are to be taken up elastically or resiliently though no chains whatever are to be stressed or tensioned. The damping device according to the Winans U.S. Pat. No. 912,927 issued in February 1909 is provided with a washing machine and connects the crank 17 of the shaft 16 with the arm 18 of the frame 12. The spacing between the arm 18 and the crank 17 is prescribed within the washing machine so that the suspension or joiner members 22 are screwed only a single time so far into the bushing or sleeve means 29, 30 until these joiner members 22 can be hung or joined into the corresponding joiner openings of the arm 18 and of the crank 17 such single occurrence occurring particularly during installation of the damping device in the washing machine. Then this damping device remains in this position and is no longer adjusted during the entire life expectancy or duration thereof. In contrast, the tensioning devices must be frequently tensioned and relieved again whereby the link or joiner members are correspondingly adjusted. The connection rod according to the Winans Patent No. 912,927 issued in February 1909 serves only to convert the rotational movement of the shaft 16 by way of the crank 17 into a to and fro movement or reciprocable movement of the arm 18. The pressure spring 26 mounted or journalled upon both U-brackets 20, 21 hereby should absorb only shocks, impacts. In the U.S. Patent Of Winans issued in February 1909 there cannot be found any showing or suggestion to use the damping device described therein as a tensioning device. This state of the art consequently concerns a teaching or component which is not at all related with the tensioning device of the present invention.

The damping device according to the U.S. Patent of Winans issued in February 1909 differs from the teaching of the present invention also essentially thereby that the threads of both joinder members 22 have the same thread pitch (FIG. 3). Consequently it would not be possible to adjust both of these joinder members simultaneously opposite to each other. Since this feature is important and meaningful for the inventive tensioning device, the thread segments 5, 5' of both tensioning spindles 1, 1' with the present invention have opposite thread pitch, so that the tensioning spindles can be adjusted simultaneously opposite to each other through rotation of the tensioning nut 2.

The tensioning spindles are adjustable in opposite directions relative to the housing. With the opposite thread pitch of both tensioning spindles there is only provided the technical means with which this opposite adjustment is attained.

The opposite adjustment is attained by way of the opposite thread pitch of both tensioning spindles.

In FIG. 1 of the drawings in the present case, the threads 5, 5' of the tensioning spindles 1, 1', to be accurately represented, must not be with both threads particularly according to FIG. 1 having the same pitch which would be contradictory to the description. There is expressly set forth that both tensioning spindles 1, 1' have one right-thread and one left-thread. FIG. 1 shows the threads 5, 5' correctly illustrated. The description properly sets forth the embodiment of the threads 5, 5' as correctly illustrated.

Any attempt to consider that the parts 20, 21 provided with threads can be turned or rotated for adjustment of the connection members 22 shows only that the state of the art is being considered only with the benefit of hindsight when having knowledge of the present inventive solution and teaching. Both U-brackets 20, 21 are surrounded by the pressure spring 26 according to FIG. 3, so that both brackets 20, 21 could hardly be rotated or turned. Even if there is assumed that with the damping device according to the Winans patent, issued in February 1909, there could be tensioning, then the U-brackets 20, 21 could only be rotated with great effort if they could be rotated at all. Moreover, with the turning or rotating procedure there is stressed that the pressure spring 26 would positively be damaged. With this turning or rotational procedure additionally the link or joinder members 22 would be turned or rotated in the same direction so that no tensioning would be possible at all by turning the rotation of the brackets 20, 21. Moreover in the measure or extent to which the one link or connection member 22 is turned or rotated out of the U-bracket, hanger or clamp belonging therewith there is noted that the other connection or link member is rotated in the U-bracket, hanger or clamp belonging therewith so that the spacing between both connection or link members always remains identical or the same.

Since the U. S. Patent of Winans issued in February 1909 shows no tensioning device at all but rather only shows a damping device, the expert or average man skilled in the art has no reason or basis to consider the disclosure of the U.S. Patent of Winans during the solution of a problem which arises only with tensioning devices. The rotational securing which is integrated within the tensioning device is lacking with the damping device according to the U.S. Patent of Winans. There is also lacking a tensioning nut with which two threaded spindles could be adjusted simultaneously and in opposite directions. Also no handle or lever is provided for turning or rotation of such a tensioning nut.

The U.S. Pat. No. 3,759,351—Purple issued in September 1973 likewise shows only a damping device though no tensioning device at all has been suggested therein. As already set forth in detail in the foregoing paragraphs, damping devices both as to the functioning thereof and also as to the constructive arrangement thereof are completely different when compared with tensioning devices. The U.S. Patent of Purple issued in September 1973 could not in any event provide a showing or suggestion to replace the pressure spring 26 according to the Winans Patent issued in February 1909 by way of disc springs 38 through 41. Such a damping device however would likewise not be a tensioning device. The disc springs could likewise only serve the purpose of absorbing impacts or shocks. Such a damping device would never have any rotational securing, no device with which two threaded spindles could be adjusted simultaneously and oppositely to each other, and also no handle or lever for actuation of a tensioning nut.

The connection member 22 of the Winans Patent issued in February 1909 could be believed to be hindered or prevented from rotation by a suitable force. Apparently separate devices are to be provided on the connection members 22 and these devices engage at the angled-off ends and consequently the devices are to preclude or hinder a rotation of the connection members 22. As already set forth in the foregoing paragraphs, such thinking or conception is remote for the average man skilled in the art since with the damping device according to the U.S. Patent of Winans issued in February 1909, the link or connection members 22 are not at all to be adjusted during the insertion or installation of the damping device but rather the connection members 22 are to maintain the adjusted position or location before the installation in the washing machine. However, even if such thinking were to be followed, then such a rotational securing particularly would not lead to the present inventive solution. Moreover with the inventive tensioning device there is noted that the rotational securing is integrated in the tensioning device and is formed by the bolts 15, 15' and the longitudinal slot 17, 17' in the housing part 13, 13'. With the inventive tensioning device, accordingly, no additional rotational securing is necessary which would only make more difficult the handling capability of the tensioning device in any event. An operator must not bother with the rotational securing during the tensioning because as a consequence of the engagement of the bolt in the longitudinal slots there is assured that the threaded spindles 1, 1' are secured against rotation relative to the housing part 13, 13' belonging therewith.

The U.S. Pat. No. 2,273,753—Gelinas issued in February 1942 finally shows a tensioning device which however differs basically from the present inventive tensioning device. The tensioning device of the reference Gelinas Pat. No. 2,273,753 particularly has only both threaded spindles 20 as well as the tensioning nut 19 into which the threaded spindles are threaded or screwed. The handle or lever 23 does not pass through the tensioning nut but rather is arranged thereon. It is apparent that, with such a handle or lever, no high tensioning forces can be applied or brought about.

In this connection attention is directed to the fact that with the present inventive tensioning device for example, tensioning forces up to several hundred kilograms must be applied or brought forth. For example, there is noted that the inventive tensioning devices are used for clamping or lashing chains with which possible motor vehicles are secured or lashed on ships. Under these circumstances enormously high tensioning forces must be generated through the tensioning device in order to lash and secure the vehicle absolutely securely on the ship. With the tensioning device according to the U.S. Patent of Gelinas issued in February 1942 this would not be possible; with the lever or handle 23, such high tensioning forces could not at all be applied or brought about.

Also there is not recognizable where the lever or handle should be installed with the damping device according to the Winans U.S. Pat. No. 912,927 which pressure springs 26 are replaced by the disc springs according to the Purple U.S. Pat. No. 3,579,351. Moreover the disc springs are located or seated upon the U-brackets or clamps 20, 21 of the damping device so that no space is available for the handle or lever according to the Gelinas U.S. Pat. No. 2,273,753. Consequently it is apparent that by way of the combination of features known from these three references there could not be obtained any tensioning device according to the features of the present invention.

The foreign German Offenlegungsschrift or publication No. 2 728 790 dated Jan. 18, 1979 belongs to the assignee of the present invention and the date of Jan. 18, 1979 thereof is later than the Dec. 23, 1978 German priority date established for the present case. Also the present inventor is among the joint inventors listed with this Offenlegungsschrift No. 2 728 790 published in Germany. Consequently no detailed comments are believed to be necessary for this Offenlegungsschrift which should be removed from consideration under the foregoing circumstances.

In FIG. 2A, for the left half of the illustration, disc springs have been drawn in single-layer, two-layer and three-layer arrangement.

FIG. 2a shows identically constructed plate springs arranged in the two housing structures 13, 13' in the same manner, as illustrated, for example, with respect to the plate springs installed or accommodated in the left housing structure 13, which springs engage against abutment, end surface or wall 14.

The present invention is, of course, in no way restricted to the specific disclosure of the specification and drawings, but also encompasses any modifications within the scope of the appended claims.

What is claimed is:

1. A tensioning device for suspending, stretching and tightening chains, such as tensioning chains, sling chains, tire chains and the like with the device, the device comprising in combination:
   first and second housings, each housing having at one end thereof means for connecting the housing non-rotatably to a chain and each housing having a second end which is open;
   a first threaded spindle in the first housing and projecting toward the second end of the first housing, which second end is open, the first threaded spindle having a pitch threaded in one direction;
   a second threaded spindle in the second housing projecting toward the second end of the second housing, which second end is open, the second threaded spindle having a pitch threaded in a direction opposite the first threaded spindle;
   means cooperating between each spindle and each housing for preventing rotation of the spindle relative to its respective housing while permitting sliding movement of the spindle relative to its respective housing;
   a tensioning member extending into the second end of each housing and having oppositely handed threaded portions therein at opposite ends thereof, the threaded portions being threadably engaged with the threaded spindles wherein, when the tensioning member is rotated in one direction, the spindles move toward one another, and when the tensioning member is rotated in the opposite direction, the spindles move away from one another; the tensioning member holding the first and second housings in spaced relation and defining a space therebetween;
   means on the tensioning member located in the space between the housings for establishing a non-rotational relationship with the tensioning member;
   a tool cooperating with the means on the tensioning member for rotating the tensioning member;
   first abutments secured in each housing between the first and second ends thereof;
   second abutments on each spindle in opposed relation to the first abutments;
   a set of cup springs in each housing disposed between the first and second abutments, wherein when the tensioning member is turned to draw the spindles together, the cup springs are compressed, whereby a chain attached to the tensioning device can be tensioned by drawing the threaded spindles together without turning the chain.

2. A tensioning device in combination according to claim 1, in which the cup springs of said cup spring set are respectively identically embodied and are selectively arranged identically in the respective housing part.

3. A tensioning device in combination according to claim 1, in which the cup springs of said spring set are arranged alternatingly and differently at least in single layers in the housing ports.

4. A tensioning device in combination according to claim 3, in which the majority of cup springs of said spring set have one layer and the remaining cup springs have multiple layers.

5. A tensioning device in combination according to claim 4, in which said multiple layer arrangement of cup springs forms layers having differing spring numbers.

6. A tensioning device in combination according to claim 3, in which approximately ½ of the cup springs of said spring set are single layer, and approximately the other half thereof are arranged differently in multiple layers.

7. A tensioning device in combination according to claim 6, in which in said multi-layer half approximately 28% of the cup springs are arranged in dual layers, and approximately 25% in triple layers.

8. A tensioning device in combination according to claim 1, in which more than half of the spring path of the spring set is preloaded with half force which is at least smaller by approximately ½ than the preloading force of the remaining spring path.

9. A tensioning device in combination according to claim 8, in which 80% of the spring path is preloaded with half force.

10. A tensioning device in combination according to claim 1, which includes a plurality of cup spring sets.

11. A tensioning device in combination according to claim 10, in which each set includes differing layers.

12. A tensioning device in combination according to claim 1, in which the means for preventing rotation of the spindle relative to the housing includes bolt means fixed to the threaded spindles to secure the threaded spindles against rotation and an axially extending slot which receives the bolt means to allow the threaded spindles to slide while being held against rotation.

13. A tensioning device in combination according to claim 12, in which said bolt means is provided on an abutment-wall plate means of said tensioning spindle means.

14. A tensioning device in combination according to claim 12, in which said bolt means is located radially of said tensioning spindle means.

* * * * *